United States Patent Office 3,234,280
Patented Feb. 8, 1966

3,234,280
TRIPHENYLAMINE COMPOUNDS AND PREPARATION THEREOF
Charles J. Fox and Arthur L. Johnson, Rochester, N.Y., assignors to Eastman Kodak Company, Rochester, N.Y., a corporation of New Jersey
No Drawing. Filed Dec. 29, 1961, Ser. No. 163,092
11 Claims. (Cl. 260—576)

The present invention relates to novel polymeric and nonpolymeric compounds and to their use as novel photoconductive substances for preparing electrophotographic photoconductive layers.

Electrophotographic processes which depend on photoconductive layers include (a) xerographic processes in which, for example, a photoconductive layer on an electrically conducting support is provided with a uniform electrostatic charge in the dark, given an image exposure to light which causes the charge to be selectively dissipated in proportion to the intensity of the incident radiation, and then toned with a powder having optical density which adheres in the areas of residual charge, and (b) photoconductographic processes in which, for example, a photoconductive layer provides in areas of image exposure sufficient conductivity to enable formation of a visible image by an electrolytic process activated by an externally applied source of electric current. Processes of these xerographic and photoconductographic types are well known and have been described in such U.S. and foreign patents as U.S. 2,297,691; 2,551,582; 3,010,883 and in British 188,030 and 464,112. The present invention is concerned principally with xerographic processes.

Photoconductive compositions for use in xerographic layers have included inorganic photoconductive materials, such as selenium, sulfur, cadmium sulfide, and zinc oxide, as well as organic materials such as anthracene and naphthalene. The present invention concerns a new class of novel organic materials for use in preparing photoconductive layers. The photoconductive substances of the present invention are especially useful in the art since they can be sensitized to greatly improved speeds by admixture of sensitizing compounds and, moreover, some photoconductive compounds of the present invention are film-forming materials which require no binder.

It is, therefore, an object of the present invention to provide new polymeric and nonpolymeric compounds and a process for their preparation. Another object of our invention is to provide novel photoconductive compounds. Anther object of the present invention is to provide novel photoconductive compositions for use in preparing photoconductive layers of electrophotographic materials. A further object is to provide novel photoconductive compositions which can be sensitized to give highly improved speeds. Still another object is to provide photoconductive substances which can be employed to prepare self-supporting photoconductive layers. Other objects will become apparent from a reading of the specification and appended claims.

These objects are accomplished by condensing a triphenylamine with a halide of the dibasic carboxylic acid. The products of this reaction, according to the present invention, comprise those represented by the following general formula:

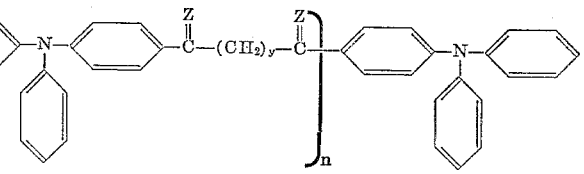

wherein $y$ is from 0 to about 16, and $n$ is an integer (e.g., from 1 to about 8), and Z represents oxygen or two hydrogen atoms.

The products of the invention can be prepared according to the following reactions:

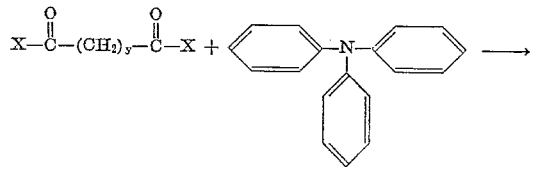

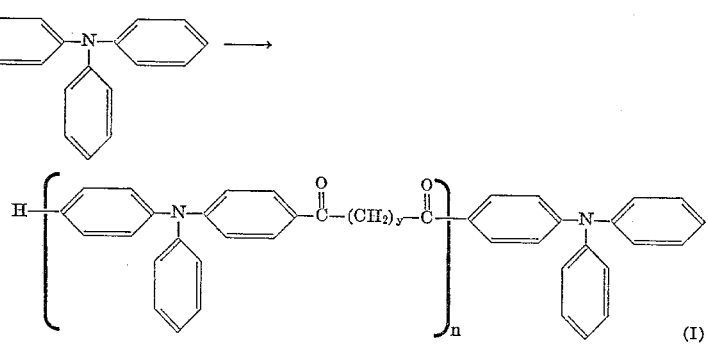

and the product obtained by hydrogenation of product I.

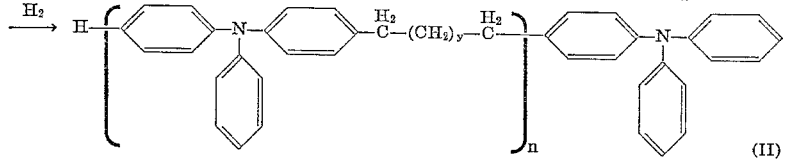

wherein X is a halogen atom (e.g., iodine, bromine, chlorine, etc.), $y$ is from 0 to about 16, and $n$ is an integer (e.g. from 1 to about 8).

In accordance with the present invention, the products which are useful as photoconductors in xerographic layers according to the invention are represented by Formulas I and II above. These products can be either polymeric or nonpolymeric depending upon the reaction conditions or on the particular halide reagent used. For example, nonpolymeric products are obtained where an excess of one reagent of the reaction is employed, e.g., where an excess of triphenylamine is employed as compared to the amount of a halide of a dibasic carboxylic acid. On the other hand, polymeric products are obtained where the reagents are used in equimolar ratio. Polymeric reaction products are also more readily formed where the longer chain carboxylic reactants are used, e.g., such a reactant having six carbon atoms or more. When in the present specification we refer to polymeric reaction products, we mean such products having an average molecular weight of about 500 to about 6000 or more.

In carrying out certain of the reactions of the invention, sometimes a mixture of product can be obtained. For example, where the halide of a dibasic carboxylic acid reactant is oxalyl chloride, the reaction product can be a mixture of 4,4'-bis(diphenylamino)benzil and the carbinol base of hexaphenylpararosaniline. It was found that each of the above components of the reaction mixture were found to have photoconductive properties according to the present invention.

In forming the condensation products of the invention, the reactants were contained in suitable solvents such as methylene chloride, nitrobenzene, and the like, and the reaction carried out in the presence of a catalyst, such as a Lewis acid. Suitable such catalysts include aluminum chloride, ferric chloride, stannic chloride, boron trifluoride, zinc chloride, and the like. When in the present specification, we refer to Lewis acids, we mean a reagent which can act as an electron acceptor, for example, as described in Fieser & Fieser, "Organic Chemistry," 3rd edition, Reinhold Publishing Corporation, New York, pages 138 and 537. In preparing the soluble, linear polymer derivatives of the invention, it was unexpected that the reaction of the trifunctional triphenylamine molecule with the difunctional halide of the dibasic carboxylic acid did not result in an insoluble cross-linked polymer.

Typical new compositions of our invention include the following:

Polysebacyltriphenylamine

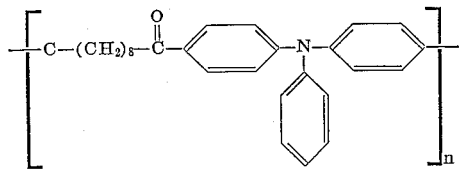

Polydecamethylenetriphenylamine

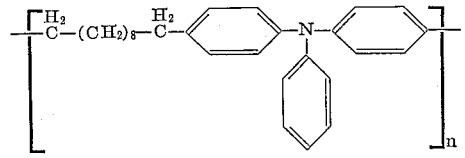

Polyadipyltriphenylamine

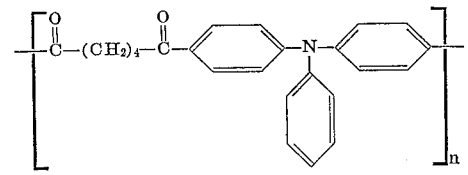

Polyhexamethylenetriphenylamine

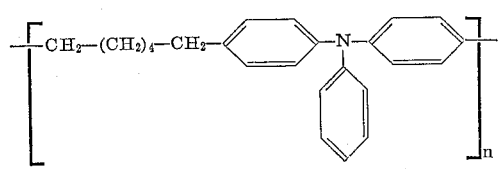

4,4'-bis((diphenylamino)benzil

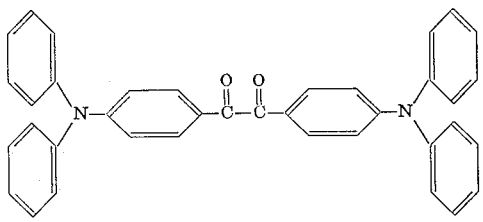

To prepare photoconductive materials of the invention for use in electrophotographic processes, the photoconductors may be coated with or without a binder. When a binder is employed, the compound is dissolved in a solution of binder and solvent and then after thorough mixing, the composition is coated on an electrically conducting support in a well-known manner, such as swirling, spraying, doctor-blade coating, and the like.

Preferred binders for use in preparing the photoconductive layers comprise polymers having fairly high dielectric strength and which are good electrically insulating film-forming vehicles. Materials of this type comprise styrene-butadiene copolymers; silicone resins; styrene-alkyd resins; silicone-alkyd resins; soya-alkyd resins; poly(vinyl chloride); poly(vinylidene chloride); vinylidene chloride; acrylonitrile copolymers; poly(vinyl acetate); vinyl acetate; vinyl chloride copolymers; poly (vinyl acetals), such as poly(vinyl butyral); polyacrylic and methacrylic esters, such as poly(methyl methacrylate), poly(n-butyl methacrylate), poly(isobutyl methacrylate), etc.; polystyrene; nitrated polystyrene polymethylstyrene; isobutylene polymers; polyesters, such as poly(ethylene-alkaryloxyalkylene terephthalate); phenol-formaldehyde resins; ketone resins; polyamide; polycarbonates; etc. Methods of making resins of this type have been described in the prior art, for example, styrene-alkyd resins can be prepared according to the method described in U.S. Patents 2,361,019; and 2,258,423. Suitable resins of the type contemplated for use in the photoconductive layers of the invention are sold under such trade names as Vitel PE-101, Cymac, Piccopale 100, and Saran F-220. Other types of binders which can be used in the photoconductive layers of the invention include such materials as paraffin, mineral waxes, etc.

In preparing photoconductive layers using polymeric derivatives of the invention, no binder is needed and a useful coating composition is obtained by preparing a solution of the photoconductive polymeric compound in a suitable solvent and coating the solution on an electrically conducting support in a well-known manner such as doctor-blade coating or one of the other methods mentioned previously. Although no binder is needed, we prefer to add to these coating compositions some binder, even if only a very minor proportion such as 1 weight percent.

Solvents of choice for preparing coating compositions of the present invention can include a number of solvents such as benzene, toluene, acetone, 2-butanone, chlorinated hydrocarbons, e.g., methylene chloride, ethylene chloride, etc., ethers, e.g., tetrahydrofuran, or mixtures of these solvents, etc.

In preparing the coating composition useful results were obtained where the photoconductor substance was present in an amount equal to at least about 1 weight percent of the coating composition. The upper limit in the amount of photoconductor substance present is not critical. As indicated previously, the polymeric materials of the present invention in many cases do not require a binder in order to obtain a self-supporting coating on the support. In those cases where a binder is employed, it is normally required that the photoconductor substance be present in an amount from about 1 weight percent of the coating composition to about 99 weight percent of the coating composition. A preferred weight range for the photoconductor substance in the coating composition is from about 10 weight percent to about 60 weight percent.

Coating thicknesses of the photoconductive composition on a support can vary widely. Normally a coating in the range from about 0.001 inch to about 0.01 inch was useful for the invention. The preferred range of coating thickness was found to be in the range from about 0.002 inch to about 0.006 inch.

Suitable supporting materials for coating the photoconductive layers of the present invention can include any of the electrically conducting supports, for example, paper (at a relative humidity above 20 percent); aluminum-paper laminates; metal foils, such as aluminum foil, zinc foil, etc.; metal plates, such as aluminum, copper, zinc, brass, and galvanized plates; regenerated cellulose and cellulose derivatives; certain polyesters, especially polyesters having a thin electro-conductive layer (e.g., cuprous iodide) coated thereon; etc. Suitable supporting materials can also include the humidity-independent conducting layers of semiconductors dispersed in polymeric binders, as described in U.S. application Serial No. 56,648, filed September 19, 1960 now U.S. Patent No. 3,112,192.

Photoconductive substances of the invention can also be prepared by the reaction of a halide of a monobasic carboxylic acid with a triphenylamine. Reactions of this type are normally carried out in the presence of a Lewis acid where the reactants ar contained in an inert solvent of the type previously described. Typical members formed by this reaction include the following.

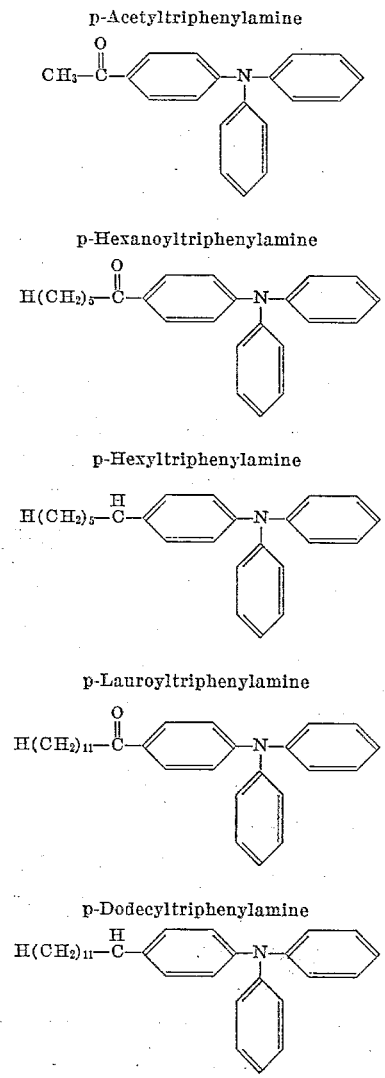

p-Acetyltriphenylamine p-Hexanoyltriphenylamine p-Hexyltriphenylamine p-Lauroyltriphenylamine p-Dodecyltriphenylamine The elements of the present invention can be employed in any of the well-known electrophotographic processes which require photoconductive layers. One such process is the xerographic process. In a process of this type, the electrophotographic element is given a blanket electrostatic charge by placing the same under a corona discharge which serves to give a uniform charge to the surface of the photoconductive layer. This charge is retained by the layer owing to the substantial insulating property of the layer, i.e., the low conductivity of the layer in the dark. The electrostatic charge formed on the surface of the photoconducting layer is then selectively dissipated from the surface of the layer by exposure to light through a negative by a conventional exposure operation such as, for example, by contact-printing technique, or by lens projection of an image, etc., to form a latent image in the photoconducting layer. By exposure of the surface in this manner, a charged pattern is created by virtue of the fact that light causes the charge to leak away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust, i.e., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Patent 2,297,691, and in Australian Patent 212,315. In processes of electrophotographic reproduction such as in xerography, by selecting a developing particle which has as one of its components, a low-melting resin, it is possible to treat the developed photoconductive material with heat and cause the powder to adhere permanently to the surface of the photoconductive layer. In other cases, a transfer of the image formed on the photoconductive layer can be made to a second support which would then become the final print. Techniques of the type indicated are well known in the art and have been described in a number of U.S. and foreign patents, such as U.S. Patents 2,297,691 and 2,551,582, and in "RCA Review," vol. 15 (1954), pages 469–484.

The photoconductive layers of the invention can also be sensitized to highly improved speed. Sensitizing compounds for use with the present photoconductive derivatives can include a wide variety of substances, such as pyrylium and thiapyrylium salts of U.S. application Serial No. 146,743, filed October 23, 1961; fluorenes, such as 7,12-dioxo-13-dibenzo(a,h)fluorene, 5,10-dioxo-4a,11-diazabenzo(b)fluorene, 3,13-dioxo-7-oxadibenzo(b,g)fluorene, and the like; aromatic nitro compounds of U.S. Patent 2,610,120; anthrones of U.S. Patent 2,670,285; quinones of U.S. Patent 2,670,286; benzophenones of U.S. Patent 2,670,287; thiazoles of U.S. Patent 2,732,301; mineral acids; carboxylic acids, such as maleic acid, dichloroacetic acid, and salicyclic acid; sulfonic and phosphoric acids; and various dyes such as triphenylmethane, diarylmethane, thiazine, azine, oxazine, xanthene, phthalein, acridine, azo, and anthraquinone dyes. The preferred sensitizers of the invention, however, are pyrylium and thiapyrylium salts, fluorenes, carboxylic acids and the triphenylmethane dyes.

Where a sensitizing compound of the invention is to be used with a photoconductive layer of the invention, it is the usual practice to mix a suitable amount of the sensitizing compounds with the coating composition so that, after thorough mixing, the sensitizing compound is uniformly distributed in the coated element. In preparing the photoconducting layers, no sensitizing compound is required to give photoconductivity in the layers which contain the photoconducting substances of the invention, so of course, the lower limit of sensitizer required in a particular photoconductive layer is zero. However, since relatively minor amounts of sensitizing compound give substantial improvement in speed in such layers, the sensitizer is preferred. The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight based on the weight of the film-forming hydrophobic coating composition. Normally, a sensitizer is added to the coating composition in an amount by weight from about 0.005 to about 5.0 percent by weight of the total coating composition.

The invention will now be described by reference to the following examples.

EXAMPLE 1

*Synthesis of polysebacyltriphenylamine*

A polymer was prepared by adding 48 grams (0.2 mole) of sebacyl chloride to a mixture of 50 grams (0.2 mole) of triphenylamine and 56 grams (0.4 mole) of zinc chloride in 500 ml. of dichloromethane during a 30-minute interval. The resulting mixture was stirred while refluxing for 24 hours. After hydrolysis and washing with water, the polymer was isolated as a viscous mass by precipitation in acetone. Redissolving of the product in dichloromethane and precipitation in methanol resulted in 20 grams of a slightly yellow solid product.

Calculation for $C_{28}H_{29}NO_2$: C, 81.8; H, 7.0; N, 3.4. Found: C, 82.5; H, 7.2; N, 3.7.

Molecular weight found: 3500.

EXAMPLE 2

*Hydrogenation of polysebacyltriphenylamine*

A solution of 10 grams (0.025 mole) of polysebacyltriphenylamine in 150 ml. of dioxane was hydrogenated in the presence of 5 grams of copper chromite catalyst. A maximum pressure of 3750 p.s.i.g. was attained at 250° C. The mixture was filtered and the solvent removed to obtain a tacky solid product.

Calculation for $C_{28}H_{33}N$: C, 87.7; H, 8.7; N, 3.6. Found: C, 87.4/87.5; H, 7.7/7.6; N, 3.2/3.0.

Molecular weight found: 3220.

EXAMPLE 3

*Synthesis of polyadipyltriphenylamine*

The synthesis of polyadipyltriphenylamine was carried out in the manner of Example 1 except that adipyl chloride was used in place of sebacyl chloride. Using 0.1 mole of adipyl chloride and 0.1 mole of triphenylamine, following the procedure of Example 1, a yellow polymer was obtained in 17 grams yield.

Calculation for $C_{24}H_{21}NO_2$: C, 81.2; H, 5.9; N, 3.9. Found: C, 80.5; H, 5.5; N, 3.5.

Molecular weight found: 1075.

EXAMPLE 4

*Hydrogenation of polyadipyltriphenylamine*

Polyadipyltriphenylamine was hydrogenated by the procedure described in Example 2 for polysebacyltriphenylamine. The hydrogenated product obtained was a tacky solid.

Calculation for $C_{24}H_{25}N$: C, 88.1; H, 7.7; N, 4.3. Found: C, 86.5; H, 8.8; N, 4.9.

Molecular weight found: 880.

EXAMPLE 5

*Condensation of oxalyl chloride with triphenylamine*

A solution of 63 grams (0.5 mole) of oxalyl chloride in 250 ml. of methylene chloride was added dropwise over a period of 50 minutes to a slurry of 122.5 grams (0.5 mole) of triphenylamine, 140 grams (1.0 mole) of zinc chloride and 1750 ml. of methylene chloride while stirring rapidly. The color of the stirring mixture became light brown and finally purple during the addition of oxalyl chloride in the methylene chloride solvent. Stirring was continued at reflux temperature for an additional 43.5 hours and the resulting blue mixture was poured into a slurry of 500 grams of ice, 500 grams of water and 500 ml. of concentrated hydrochloric acid. After stirring for 1 hour about 1500 ml. of additional methylene chloride was added and the organic layer was washed continuously for 24.5 hours. The solvent was then removed from the solution under reduced pressure to yield 121.4 grams of a yellow material comprising a mixture of the following described components having a melting point of 90–104° C. A mixture analysis was made as follows.

Five grams of the mixture were dissolved in dichloromethane and the resulting solution was applied to a 1 in. x 3 ft. column of activated alumina (Merck 71707) for chromatographic analysis. Dichloromethane was used as the eluant. Two major fractions were obtained. One yielded 1.7 g. of yellow crystals, M.P. 159–160° C., which analysis indicated to be 4,4'-bis(diphenylamino)benzil.

Calculation for $C_{38}H_{30}N_2O_2$: C, 83.5%; H, 5.5%; N, 5.1%. M. wt. 546. Found: C, 85.5%; H, 5.0%; N, 5.3%. M. wt. 545.

The other fraction yielded 1.6 g. of blue solid, M.P. 82–84° C., which analysis indicated to be hexaphenylpararosaniline.

Calculation for $C_{55}H_{43}N_3Cl$: C, 84.7%; H, 5.4%; N, 5.4%; Cl, 4.5%. M. wt. 779. Found: C, 83.5%; H, 5.0%; N, 5.1%; Cl, 4.6%. M. wt. 770.

Since analysis indicated that the original product mixture did not contain halogen, the hexaphenylpararosaniline formed by solvolysis of the hexaphenylpararosaniline carbinol base during the chromatographic separation.

EXAMPLE 6

A photoconductive layer of 4,4'-bis(diphenylamino)-benzil obtained from Example 5 was made into an electrophotographic element by mixing 1.5 parts of this photoconductor with 0.04 part of 2,6-(4-ethylphenyl)-4-(4-amyloxyphenyl) thiapyrylium perchlorate and 1.5 parts of a resinous polyester binder which was dissolved with suitable stirring in methylene chloride and the mixture was coated on an aluminum-laminated paper support. The polyester is a copolymer of terephthalic acid and a glycol mixture comprising a 9:1 wt. ratio of 2,2-bis[4-(β-hydroxyethoxy)phenyl]propane and ethylene glycol. The coating thickness on the support was 0.004 inch thickness. After drying, the electrophotographic element was employed in a standard xerographic process which included charging under a positive corona and exposure from behind a negative transparency to a 3000° K. tungsten source of 20-foot-candle intensity at the point of exposure. The resulting electrostatic latent image was rendered visible by dusting with an electrostatically attractable powder having optical density according to the method described in U.S. Patent 2,297,691. According to the example, a high-quality positive image of the transparency was obtained. The developing powder used was Xerox 914 Developer purchased from the Xerox Corporation of Rochester, New York.

EXAMPLE 7

This example shows the relative sensitivity of electrophotographic elements prepared by coating a photoconductive layer of the invention on an electrically conducting support.

Coatings in the example were prepared with and without a binder. For example, no binder was used in coating the polyadipyltriphenylamine and polysebacyltriphenylamine compounds. In these cases, the coating was prepared by dissolving 2.0 grams of the photoconductor substance in 15 ml. of tetrahydrofuran to which was added 0.5 ml. of a tetrahydrofuran solution containing 0.025 gram of 2,6-di(4-ethylphenyl)-4-(4-amyloxyphenyl)thiapyrylium perchlorate. This dope was then coated on a conducting support at a wet thickness of 0.004 inch, dried and given a charge under a positive corona in a well known manner. The charged layer was then exposed for 3 seconds to a 3000° K. tungsten source of 20-foot-candle intensity at the point of exposure through a 0.1 log E step-tablet, and developed by treatment with a particulate electrostatically attractable toning developer such as Xerox 914 Developer having optical density according to the method described in U.S. Patent 2,297,691.

The layers of the example which incorporated a nonpolymeric derivative of the invention were prepared by incorporating in a binder as described in Example 6. In each case, the nonpolymeric compositions were subsequently treated in the same manner as described in the above paragraph. The electrophotographic results appear below.

TABLE I

| Photoconductor | Image obtained | No. of visible steps observed after 3-second exposure |
|---|---|---|
| 1. Polyvinylcarbazole (control) | Yes | 8 |
| 2. Polyadipyltriphenylamine (no binder) | Yes | 16 |
| 3. Polyhexamethylenetriphenylamine (no binder) | Yes | |
| 4. Polysebacyltriphenylamine (no binder) | Yes | 12 |
| 5. Polydecamethylenetriphenylamine | Yes | |
| 6. 4,4'-Bis(diphenylamino)benzil | Yes | 21 |
| 7. Hexaphenylpararosaniline | Yes | 21 |
| 8. 1:1 Mixture of purified 4,4'-bis(diphenylamino)benzil and hexaphenylpararosaniline. | Yes | 23 |
| 9. Product mixture of Example 5 containing mainly 4,4'-bis(diphenylamino)benzil and hexaphenylpararosaniline carbinol base. | Yes | 21 |

EXAMPLE 8

*Reaction product of triphenylamine and phosgene*

Eight grams (0.08 mole) of phosgene gas was added to 30 grams (0.12 mole) of triphenylamine in a glass-lined autoclave and the mixture was heated at 200° C. for 4 hours. After cooling, a blue product formed which was extracted with acetone. This product (Fraction A) was an acetone-insoluble material and was dissolved in chloroform and precipitated in ether. Fraction A comprised about ten grams of a blue solid, which was analyzed to be hexaphenylpararosaniline, and had a melting point of 275° C. A second fraction, an acetone-soluble material, was isolated by precipitation into ether. Eight grams of this second fraction (Fraction B) comprising another blue solid was isolated which had a M.P. of 175° C. Fraction B is considered to be p,p'-bis(diphenylamino)benzophenone.

An organic photoconducting system consisting of 1.5 g. of the resinous polyester of Example 6, 1.5 gram of triphenylamine, and 0.04 gram of 2,6-(4-ethylphenyl)-4-(4-amyloxyphenyl)thiapyrylium perchlorate dissolved in 13 ml. of dichloromethane was sensitized by the addition of 0.04 gram of either Fraction A or Fraction B. The resulting solution was coated on aluminum foil backed with paper. After charging under a positive corona the coating was exposed to a 3000° K. tungsten source with an intensity of 20-foot candles at the exposure point for 3 seconds through an 0.1 log E step tablet. The latent image was developed with a positive developer such as Xerox 914 (purchased from the Xerox Corporation of Rochester, New York). In the coating in which Fraction A was used, 21 steps were observed and in the coating in which Fraction B was used, 23 steps were observed. When Fractions A or B were omitted from the coating, about 16 steps were observed.

The invention has been described in detail with particular reference to preferred embodiments thereof but it will be understood that variations and modifications can be effected within the spirit and scope of the invention as described hereinabove and as defined in the appended claims.

What we claim as our invention and desire secured by Letters Patent of the United States is:

1. A compound of the formula:

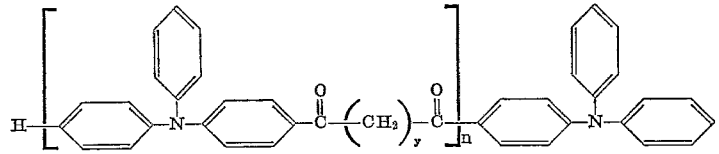

wherein y is from 1 to about 16 and n is an integer from 2 to about 8.

2. A compound of the formula:

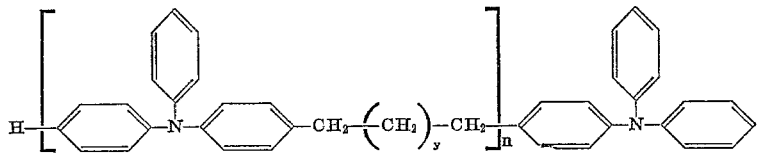

wherein y is from 1 to about 16 and n is an integer from 2 to about 8.

3. 4,4'-bis(diphenylamino)benzil.
4. Polysebacyltriphenylamine.
5. Polydecamethylenetriphenylamine.
6. Polyadipyltriphenylamine.

7. Polyhexamethylenetriphenylamine.

8. The process of preparing compounds of the formula:

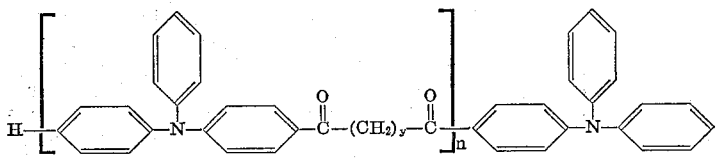

wherein $y$ is from 1 to about 16 and $n$ is an integer from 2 to about 8, comprising condensing a halide of a dibasic carboxylic acid of the formula

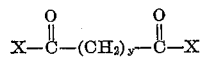

wherein X is a halogen atom, $y$ is from 1 to 16, with triphenylamine in the presence of a Lewis acid catalyst said halide being a member selected from the group consisting of chloride, bromide and iodide and said halogen atom being a member selected from the group consisting of chloride, bromide and iodide.

9. The process of preparing 4,4'-bis(diphenylamino)-benzil by condensing oxalyl chloride with triphenylamine in the presence of a Lewis acid catalyst.

10. The process of preparing polysebacyltriphenylamine by condensing sebacyl chloride with triphenylamine in the presence of a Lewis acid catalyst.

11. The process of preparing polyadipyltriphenylamine by condensing adipyl chloride with triphenylamine in the presence of a Lewis acid catalyst.

References Cited by the Examiner

UNITED STATES PATENTS

| | | | |
|---|---|---|---|
| 2,290,860 | 7/1942 | Burk et al. | |
| 2,530,769 | 11/1950 | Hollis | 260—576 |
| 2,558,285 | 6/1951 | Wilson | 260—576 |
| 2,572,967 | 10/1951 | Smith | 260—576 |
| 3,041,165 | 6/1962 | Sus et al. | 96—1PC |
| 3,066,023 | 11/1962 | Schlessinger | 96—1PC |

OTHER REFERENCES

Richter: "Textbook of Organic Chemistry," 1952, 3rd edition, pp. 480–481.

CHARLES B. PARKER, *Primary Examiner.*

NORMAN G. TORCHIN, *Examiner.*